US006660935B2

(12) United States Patent
Southard et al.

(10) Patent No.: US 6,660,935 B2
(45) Date of Patent: Dec. 9, 2003

(54) LED EXTRUSION LIGHT ENGINE AND CONNECTOR THEREFOR

(75) Inventors: Paul W. Southard, Broadview Heights, OH (US); Srinath K. Aanegola, Parma Heights, OH (US); James T. Petroski, Parma, OH (US)

(73) Assignee: GELcore LLC, Valley View, OH (US)

( * ) Notice: Subject to any disclaimer, the term of this patent is extended or adjusted under 35 U.S.C. 154(b) by 0 days.

(21) Appl. No.: 09/866,581

(22) Filed: May 25, 2001

(65) Prior Publication Data

US 2002/0174995 A1 Nov. 28, 2002

(51) Int. Cl.[7] .................................................. H02G 3/04

(52) U.S. Cl. ........................... 174/48; 174/50; 362/226; 362/249; 439/460

(58) Field of Search ............................. 174/50, 48, 53, 174/117 F, 117 FF, 88 R; 439/439, 425, 411, 412, 460, 98, 466, 419, 417, 280; 362/226, 249, 800, 239, 812; 40/550

(56) References Cited

U.S. PATENT DOCUMENTS

| | | | | | |
|---|---|---|---|---|---|
| 671,338 | A | * | 4/1901 | Halford | 439/111 |
| 3,115,541 | A | * | 12/1963 | Hanner et al. | 174/88 R |
| 4,173,035 | A | * | 10/1979 | Hoyt | 361/749 |
| 4,419,538 | A | * | 12/1983 | Hansell, III | 174/117 F |
| 4,631,650 | A | * | 12/1986 | Ahroni | 439/409 |
| 4,638,117 | A | * | 1/1987 | Ney | 174/117 F |
| 4,777,573 | A | * | 10/1988 | Liao | 439/419 |
| 4,807,098 | A | * | 2/1989 | Ahroni | 174/114 R |
| 4,813,883 | A | * | 3/1989 | Staley | 439/391 |
| 4,815,814 | A | * | 3/1989 | Ulijasz | 174/71 R |
| 4,855,882 | A | * | 8/1989 | Boss | 439/425 |
| 4,984,999 | A | * | 1/1991 | Leake | 439/419 |
| 5,010,463 | A | * | 4/1991 | Ross | 439/426 |
| 5,051,877 | A | * | 9/1991 | Liao | 439/419 |
| 5,121,310 | A | * | 6/1992 | Ahroni | 362/226 |
| 5,141,449 | A | * | 8/1992 | Tieszen | 439/419 |
| 5,154,508 | A | * | 10/1992 | Ahroni | 439/360 |
| 5,238,424 | A | * | 8/1993 | Vindum | 439/425 |
| 5,330,368 | A | * | 7/1994 | Tsuruzono | 439/419 |
| 5,337,225 | A | * | 8/1994 | Brookman | 362/226 |
| 5,367,122 | A | * | 11/1994 | de Olano | 174/117 F |
| 5,526,250 | A | * | 6/1996 | Ting et al. | 439/419 |
| 5,559,681 | A | * | 9/1996 | Duarte | 439/210 |
| 5,584,567 | A | * | 12/1996 | Rumpel | 362/249 |
| 5,601,448 | A | * | 2/1997 | Poon | 439/417 |
| 5,829,865 | A | * | 11/1998 | Ahroni | 439/611 |
| 5,934,930 | A | * | 8/1999 | Camps et al. | 439/425 |
| 5,967,823 | A | * | 10/1999 | Tsui | 439/280 |
| 6,017,241 | A | * | 1/2000 | Komai | 439/419 |
| 6,079,848 | A | * | 6/2000 | Ahroni | 362/226 |
| 6,095,847 | A | * | 8/2000 | Lin | 439/414 |
| 6,116,944 | A | * | 9/2000 | Tseng | 439/419 |
| 6,261,119 | B1 | * | 7/2001 | Green | 439/425 |
| 6,290,365 | B1 | * | 9/2001 | Schlesinger | 362/226 |
| 6,367,952 | B1 | * | 4/2002 | Gibboney, Jr. | 439/419 |
| 6,383,013 | B1 | * | 5/2002 | Ghesla et al. | 439/521 |
| 6,478,450 | B1 | * | 11/2002 | Grajcar | 362/249 |

* cited by examiner

*Primary Examiner*—Dean A. Reichard
*Assistant Examiner*—Angel R. Estrada
(74) *Attorney, Agent, or Firm*—Fay, Sharpe, Fagan, Minnich & McKee, LLP

(57) ABSTRACT

An LED light engine includes an electrical conductor, a flexible, electrically insulating covering surrounding the electrical conductor, and an LED. The electrical conductor includes a plurality of conductive elements. A connector is mechanically secured to the flexible insulating covering and electrically contacts the electrical conductor. In one embodiment, the LED electrically contacts the electrical conductor and is mechanically secured to the insulating covering. Alternatively, the LED electrically contacts the electrical conductor and is mechanically secured to the insulating covering via the connector.

18 Claims, 3 Drawing Sheets

LED EXTRUSION LIGHT ENGINE AND CONNECTOR THEREFOR

BACKGROUND OF THE INVENTION

1. Field of the Invention

The present invention relates generally to the field of lighting systems. It finds particular application in conjunction with light emitting diode strips and will be described with particular reference thereto. It will be appreciated, however, that the invention is also amenable to other like applications.

2. Discussion of the Art

Channel letters are known to those skilled in the art of making commercial signs as the most attractive and expensive form of sign lettering. Briefly, channel letters usually include a plastic or metal backing having the shape of the letter to be formed. Metal channel siding, frequently formed of aluminum with a painted or otherwise finished interior and exterior surface, is attached to and sealed to the letter backing, giving depth to the letter to be formed. Electrical lighting fixtures, such as neon tubing and mounting brackets, are attached to the letter backing. Typically, a colored, translucent plastic letter face is attached to the front edge portion of the channel side material.

As discussed above, neon lighting is typically incorporated into channel lettering systems. Neon systems are very fragile and, therefore, tend to fail and/or break during manufacture, shipping or installation. Also, such lighting systems use high voltage (e.g., between about 4,000 and about 15,000 volts) electricity to excite the neon gas within the tubing. High voltage applications have been associated with deaths by electrocution and building damage due to fire. Semiconductor lighting (e.g., light emitting diodes), that overcomes most of these drawbacks, has been used for channel lettering.

One such conventional channel lettering device attaches a light emitting diode ("LED") system to a back of a channel letter such that the LED system emits light toward a translucent face at a front of the device. The LEDs are spaced at regular intervals (e.g., 2 inches) and are pressed into a socket. The socket is designed for a press-fit of a modified Super Flux (Piranha) package. The lead frames of the Piranha are bent 90 degrees to fit into the socket. The connection for the LED is similar to insulation displacement ("IDC"). The socket also has two (2) IDC places for a red and black wire. This system puts all of the LEDs in parallel. Furthermore, the two part power supply (Initial (120 VAC to 24 VDC) and the Secondary (24 VDC to ~2.3 VDC)) have two (2) basic wiring connections. The secondary has a sense circuit, which has one (1) LED attached for determining the voltage applied to the rest of the LEDs that are attached to the second connection.

Another conventional channel lettering device attaches to a side of the channel letter and is pointed toward the backing. The diffuse surface of the channel letter walls provides a uniform appearance. Each module has a predetermined number of LEDs electrically connected in series. Furthermore, all of the modules are daisy chained together in a parallel circuit. The LEDs are mounted on an aluminum base for heat sinking purposes.

Another conventional channel lettering device uses a plurality of surface mounted LEDs with an integral connector system.

Although these conventional LED channel lettering systems overcome some of the drawbacks associated with neon systems, other shortcomings are evident. For example, the conventional LED channel lettering systems offer only limited flexibility. More specifically, the LEDs cannot be easily set into a desired shape involving significant curves or bends (e.g., wrapped around a pole or in a very small radius (<3 inches). Furthermore, the LEDs cannot be easily moved from one lighting application to another.

The present invention provides a new and improved apparatus and method that overcomes the above-referenced problems and others.

BRIEF SUMMARY OF THE INVENTION

An LED light engine includes an electrical conductor, a flexible, electrically insulating covering surrounding the electrical conductor, and an LED. The LED electrically contacts the electrical conductor and is mechanically secured to the insulating covering.

In accordance with one aspect of the invention, the electrical conductor includes a plurality of conductive elements.

In accordance with a more limited aspect of the invention, each of the conductive elements includes about seven (7) strands and is about 14 gauge.

In accordance with another aspect of the invention, the flexible covering surrounds and electrically insulates each of the conductive elements.

In accordance with a more limited aspect of the invention, the LED includes a plurality of electrical leads. A pair of the leads displaces the insulating covering and contacts respective ones of the conductive elements.

In accordance with an even more limited aspect of the invention, each of the electrical leads is wedge-shaped.

In accordance with another aspect of the invention, the flexible covering includes a plurality of dips positioned for aligning the leads with the conductive elements.

In accordance with another aspect of the invention, a connector is mechanically secured to the flexible insulating covering and electrically contacts the electrical conductor. The LED electrically contacts the electrical conductor and is mechanically secured to the insulating covering via the connector.

In accordance with a more limited aspect of the invention, the conductor includes a plurality of conductive elements, each of which is electrically insulated by the flexible covering from the other conductive elements. The connector includes a plurality of electrical contacts that extend through the flexible covering and electrically contact respective ones of the conductive elements. The LED is electrically connected to the electrical contacts.

In accordance with an even more limited aspect of the invention, each of the electrical contacts is V-shaped. Each of the conductive elements is positioned within an opening defined by the respective V-shaped electrical contact.

One advantage of the present invention is that it may be used with direct or indirect multi-color illumination systems including LED strip lighting systems.

Another advantage of the present invention is that it permits LEDs to be evenly spaced to provide a uniform appearance in or on an application.

Another advantage of the present invention is that it provides a substantially equal intensity to neon in the lighting system.

Another advantage of the present invention is that it provides for in-plane and out-of-plane bending of the illumination system (e.g., wrapping the illumination system around a pole).

Another advantage of the present invention is that the connector may be mounted on a wire that is set up on edge for maximum flexibility around small radius bends.

Another advantage of the present invention is that the illumination system may be spooled.

Another advantage of the present invention is that it provides for quick and easy installation of a light engine into an application.

Another advantage of the present invention is that it reduces electrical and/or fire hazards.

Another advantage of the present invention is that it reduces energy consumption.

Another advantage of the present invention is that it reduces installation and shipping breakage.

Another advantage of the present invention is that it provides for multi-colored lighting systems.

Still further advantages of the present invention will become apparent to those of ordinary skill in the art upon reading and understanding the following detailed description of the preferred embodiments.

Another advantage of the present invention is that the connectors can be added or removed from the insulating wire.

Another advantage of the present invention is that it can be cut to any useful length.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE INVENTION

Figure 1:
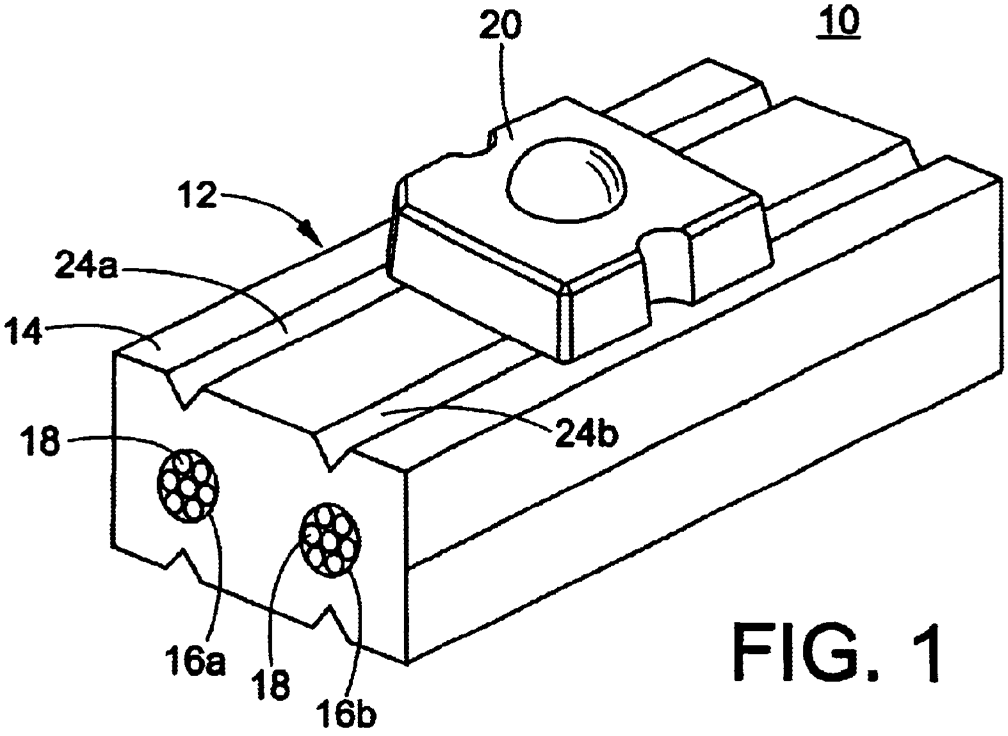
FIG. 1 illustrates an LED light engine according to a first embodiment of the present invention.

With reference to FIG. 1, a light emitting diode ("LED") light engine 10 includes a flexible electrical conductor 12 surrounded by a flexible, electrically insulating covering 14. More specifically, the conductor 12 includes a plurality of substantially parallel conductive elements 16, each of which is electrically insulated by the insulating covering 14. In the preferred embodiment, the insulating covering 14 includes rubber, PVC, silicone, and/or EPDM. However, other material are also contemplated.

Preferably, the conductor 12 includes two (2) conductive elements 16*a,* 16*b*. Furthermore, each of the conductive elements 16*a,* 16*b* is preferably sized to be about 14 gauge. Additionally, each of the conductive elements 16*a,* 16*b* is preferably stranded and includes a plurality of strands 18 (e.g., seven (7) strands).

The LED light engine 10 also includes an LED 20, which electrically contacts the conductive elements 16 and is mechanically secured to the insulating covering 14. More specifically, with reference to FIG. 2, the LED 20 includes a plurality of electrical leads 22 (e.g., one pair or two pairs of the leads 22). Although only one pair of the leads 22*a,* 22*b* is necessary, additional pairs of the leads 22*c,* 22*d* offer added stability to the LED 20 mounted on the conductor. Also, additional pairs of the leads 22 provide means for dissipating heat, thereby permitting more current to be used for powering the LED 20. Each of the pairs of leads 22 includes a first lead 22*a,* 22*d,* which connects, for example, to a negative electrical power source and a second lead 22*b,* 22*c,* which connects, for example, to a positive electrical power source.

Figure 2:
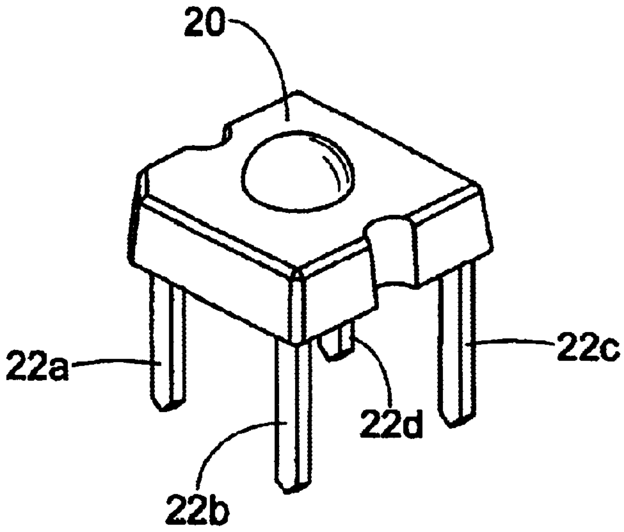
FIG. 2 illustrates a perspective view of the LED shown in FIG. 1.

With reference to FIGS. 1 and 2, the LED 20 is mechanically and electrically secured to the conductor 12 by passing the leads 22 through the insulating covering 14 via an insulation displacement technique. Furthermore, after passing through the insulating covering 14, the leads 22 contact the respective conductive elements 16. Preferably, the leads 22 include tips that are wedge-shaped needles. The wedge-shaped needle tips of the leads 22 pass between the strands 18 of the respective conductive elements 16*a,* 16*b* to form electrical contacts between the leads 22 and the conductive elements 16.

Preferably, the LED 20 is secured to the conductor 12 when the conductor 12 is positioned flat (i.e., when the conductive elements 16*a,* 16*b* run in a common substantially horizontal plane which is above a horizontal surface).

Optionally, the conductor 12 includes two (2) dips (grooves) 24*a,* 24*b* in the insulating covering 14. The dips 24*a,* 24*b* are positioned substantially above the respective conductive elements 16*a,* 16*b,* respectively. Before the LED 20 is secured to the conductor 12, the leads 22 are placed in the dips 24*a,* 24*b* and, therefore, aligned over the conductive elements 16*a,* 16*b,* respectively. Then, after being aligned in the dips 24, the leads 22 are passed through the insulating covering 14 and inserted into the conductive elements 16.

Figure 3:
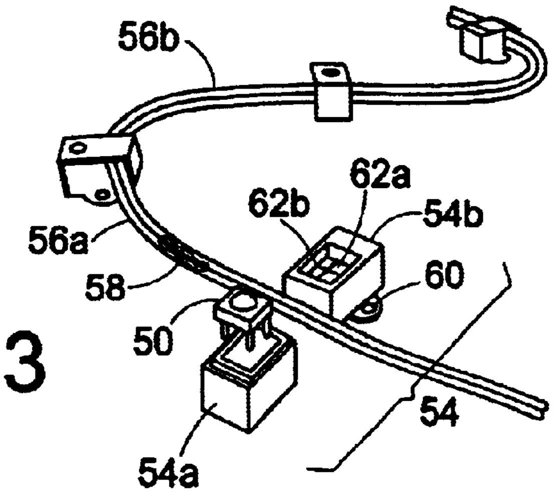
FIG. 3 illustrates an exploded view of an LED connector within a light engine according to a second embodiment of the present invention.
Figure 4:
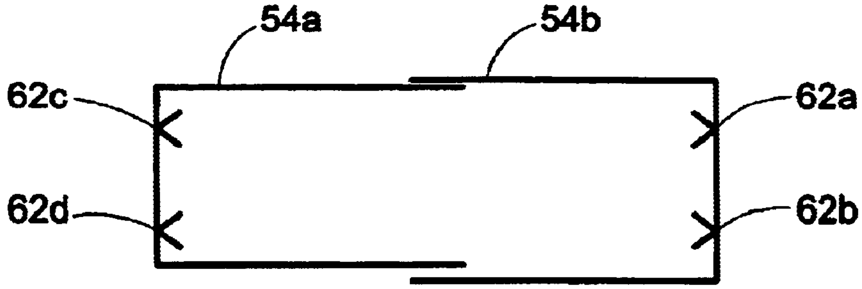
FIG. 4 illustrates a cross-sectional view of the connector of the second embodiment.

An alternate embodiment, which includes a light engine 40 that secures an LED 50 to a conductor 52 via a connector 54, is illustrated with reference to FIGS. 3 and 4. The connector 54 includes first and second sections 54*a,* 54*b*. The LED 50 is secured within the first section 54*a* before both of the sections 54*a,* 54*b* are secured (e.g., snapped) together. As in the first embodiment, the conductor 52 is flexible and includes a plurality of conductive elements 56*a,* 56*b* (e.g., two (2) conductive elements) and an insulative covering electrically isolating each of the conductive elements 56*a,* 56*b*. Furthermore, the conductive elements 56*a,* 56*b* are optionally stranded and include, for example, seven (7) strands 58.

Optionally, a hole 60 is formed in one of the sections 54*b* through which a means for securing (e.g., a screw, nail, etc.) is inserted for securing the connector 54 to a wall or other support means. For example, the connector 54 may be secured to a wall of a channel lettering housing (see FIG. 7).

The connector section 54*b* includes a plurality of electrical contacts 62 that, once the sections 54*a,* 54*b* are snapped together, electrically contact the LED 50. As is discussed below, the contacts 62, along with the sections 54*a,* 54*b,* are used for mechanically securing the connector 54 to the conductor 52. A plurality of pairs of the contacts 62 electrically communicate with each other. More specifically, the contacts 62*a,* 62*c* electrically communicate with each other while the contacts 62*b,* 62*d* electrically communicate with each other.

One set of the contacts 62*a,* 62*c,* for example, is electrically connected to a positive source of electrical power while the other set of the contacts 62*b,* 62*d*, for example, is electrically connected to a negative source of the electrical power. The set of contacts 62*a,* 62*c* is electrically isolated from the set of contacts 62*b,* 62*d*. Furthermore, the electrical contacts 62 are V-shaped and sized to accept conductive elements 56*a,* 56*b* within the respective V-shaped spaces. More specifically, the tips of the V-shaped electrical contacts 62 are sharp and formed for displacing (piercing) the insulative coverings around the conductive elements 56*a,* 56*b*.

Although only two of the contacts 62*a,* 62*b* (or, alternatively, 62*c*, 62*d*) is necessary, the connector 54 preferably includes two (2) pairs of the contacts 62 to offer added stability to the mechanical connection between the connector 54 and the conductor 52.

After displacing the insulative coverings, the conductive elements 56*a,* 56*b* are passed into the V-shaped spaces of the electrical contacts 62. As the conductive elements 56*a,* 56*b* are passed into the V-shaped spaces, the strands within the conductive elements 56 are wedged into the vertex of the "V." In this manner, a secure electrical contact is made between the conductive elements 56 and the respective electrical contacts 62. Furthermore, the strands are squeezed such that a shape of the conductor changes, for example, from round to oval. Also, as the strands are squeezed, spaces between the strands is reduced such that an overall size (e.g., diameter or circumference) of the respective conductive element 56*a,* 56*b* is reduced, for example, to a size of an "un-squeezed" three (3) strand connector.

Preferably, the connector 54 is secured to the conductor 52 when the conductor 52 is positioned on-edge (i.e., when the conductive elements 56*a,* 56*b* run in substantially parallel horizontal planes P1, P2 above a substantially horizontal surface S).

It is to be understood that although the embodiments have been described with reference to a single LED 20 (FIG. 1) and a single LED connector 54 (FIG. 3) on the conductors 12, 52, respectively, a plurality of LEDs 20 (FIG. 1) and LED connectors 54 (FIG. 3) on the conductors 12, 52, respectively, are contemplated so that the light engines 10, 40 form respective LED strips. Furthermore, the LEDs 20 (FIG. 1) and LED connectors 54 (FIG. 3) on the conductors 12, 52 of the respective LED light strips 10, 40 are preferably spaced about two (2) inches apart from each other. However, other spacings between the LEDs 20 and the LED connectors 54 are also contemplated.

Furthermore, if a plurality of the LED's 20 are secured to the conductor 12 (FIG. 1), which is oriented in a flat position, the conductor 12 is flexible in a first direction. However, if a plurality of the connectors 54 are secured to the conductor 52 (FIG. 3), which is oriented in an on-edge position, the conductor 52 is flexible in a second direction.

Figure 5:
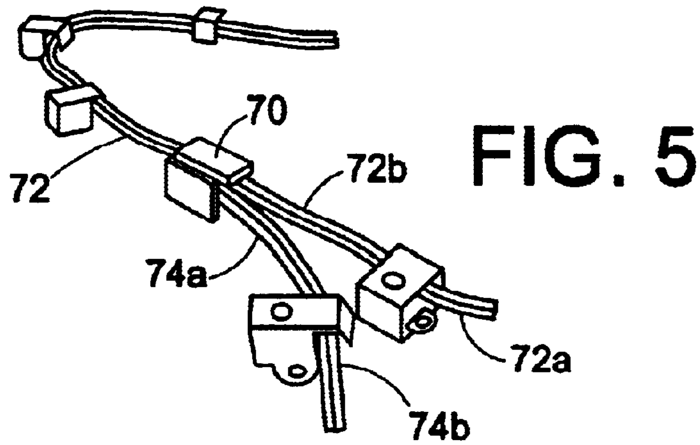
FIG. 5 illustrates a splice connector according to the present invention.
Figure 6:
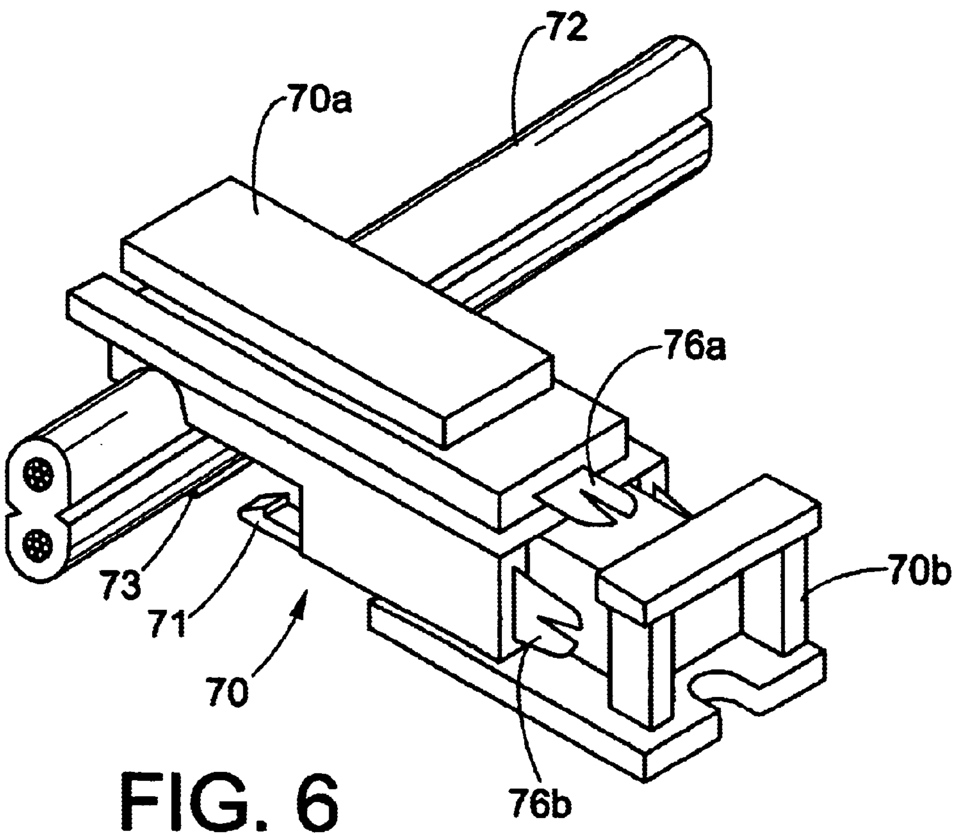
FIG. 6 illustrates an exploded view of the splice connector shown in FIG. 5.

With reference to FIGS. 5 and 6, a splice connector 70 mechanically and electrically connects a plurality of flexible conductors (e.g., two (2) conductors) 72, 74 together. Like the connector 54 (see FIG. 3), the splice connector 70 includes a plurality of portions (e.g., two (2) portions) 70*a,* 70*b*. Preferably, the portions 70*a,* 70*b* are slidably interconnected to each other. Furthermore, the portions 70*a,* 70*b* slide between two positions (e.g., an open position and a closed position). In the closed position, the portions 70*a,* 70*b* are secured together via locking tabs 71, which engage mating tabs 73. Although only one locking tab 71 and one mating tab 73 is shown in FIG. 6, it is to be understood that additional locking and mating tabs are also contemplated. Furthermore, like the conductor 52 and the connector 54 of FIG. 3, the splice connector 70 of FIGS. 5 and 6 is preferably secured to the conductors 72 (shown), 74 (not shown) when the conductors 72, 74 are oriented in an on-edge position. Also, the splice connector 70 includes a plurality of electrical contacts 76 (e.g., two (2) electrical contacts), which are preferably V-shaped and function in a similar manner to the contacts 62 shown in FIG. 4. In the closed position, the locking tabs 71 are secured by the mating tabs 73 such that the conductors 72, 74 are secured within the V-shaped contacts 76.

The conductors 72, 74 are aligned parallel and on-edge with respect to one another. Then, the splice connector 70 is secured around both of the conductors 72, 74. In this manner, respective first conductive elements 72*a,* 74*a* are mechanically and electrically secured to one another; similarly, respective second conductive elements 72*b,* 74*b* are mechanically and electrically secured to one another.

Figure 7:
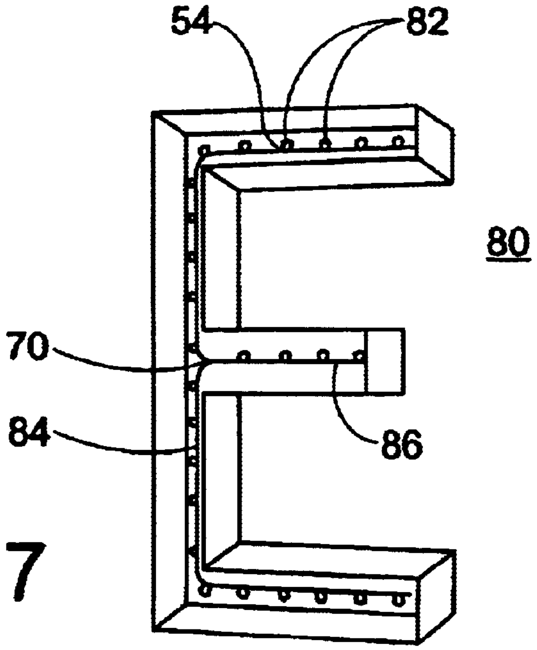
FIG. 7 illustrates the light engine and the splice connector of the present invention used within a channel lettering system.

With respect to FIG. 7, a channel lettering system 80 includes LEDs 82 mechanically and electrically connected to flexible conductors 84 according to the present invention. It is to be understood that the LEDs 82 are either directly connected to the conductors 84 (as shown in FIG. 1) or connected to the conductors 84 via connectors 54 (as shown in FIG. 3). Furthermore, the splice connector 70 is shown mechanically and electrically connecting the conductor 84 to an additional conductor 86.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A light emitting diode (LED) light engine, comprising:

an electrical cable including:

at least two flexible electrical conductors, and a flexible, electrically insulating covering surrounding the electrical conductors, the conductors arranged substantially parallel with a selected separation therebetween, the flexible covering including a plurality of dips separated by the selected separation; and an LED with a plurality of electrical leads separated by the selected separation and aligned with the dips which electrically contact the electrical conductors and mechanically pierce the insulating covering at the dips to mechanically secure the LED to the electrical cable.

2. The LED light engine as set forth in claim 1, wherein each of the conductors includes a plurality of strands and is about 14 gauge.

3. The LED light engine as set forth in claim 1, wherein each of the electrical leads is wedge-shaped.

4. The light emitting diode (LED) light engine as set forth in claim 1, wherein the at least two flexible electrical conductors include:

a positive flexible conductor and a negative flexible conductor, wherein the leads of the LED include a positive lead and a negative lead that electrically contact the positive and negative conductors, respectively.

5. A method of manufacturing an LED channel letter, the method comprising:

insulating a plurality of parallel flexible conductive elements to form a generally flat flexible electrically insulating conductor;

mechanically securing a plurality of LEDs to spaced positions along the insulated conductive elements;

during the mechanical securing, electrically contacting a plurality of leads of each LED to respective ones of the conductive elements to form a parallel interconnection of the plurality of LEDs; and fastening the generally flat flexible electrically insulating conductor in a channel letter housing with the generally flat flexible conductor positioned on-edge respective to a surface onto which the conductor is fastened.

6. The method of manufacturing an LED channel letter as set forth in claim 5, wherein:

the securing step includes:

mechanically attaching a connector to an insulating covering on the conductor; and the contacting step includes:

passing an electrical contact, secured to the connector, through the insulating covering so that an electrical connection is made between the contact and a respective one of the conductive elements.

7. The method of manufacturing an LED channel letter as set forth in claim 6, wherein the electrical contact is V-shaped, the passing step including:

securing the conductive element within the V-shaped contact.

8. A channel letter comprising:

a substantially flat flexible cable including an electrically insulating sheath which contains positive and negative conductors electrically isolated from one another, the sheath providing a spacing between the positive and negative conductors;

a plurality of light emitting diode (LED) devices spaced apart from one another on the cable, each of the LED devices having an LED including positive and negative leads mounted on a connector which mechanically secures the LED device to a portion of the flexible cable and electrically connects the positive and negative LED leads to the positive and negative conductors through positive and negative conductive piercing members which pierce the sheath to make electrical contact with the respective conductors; and a channel letter housing including a securing surface onto which the connectors of the LED devices are secured, the connectors being secured such that the substantially flat flexible cable is positioned on-edge with respect to the securing surface of the channel letter housing.

9. The channel letter as set forth in claim 8, wherein each connector includes:

a first connector section that receives the LED; and a second connector section that snaps together with the first connector section to secure the connector to the flexible cable portion.

10. The channel letter as set forth in claim 8, wherein each conductive piercing member includes:

a bifurcated end defining a gap sized to receive the respective conductor.

11. The channel letter as set forth in claim 8, wherein each connector includes:

a first section that receives the LED; and a second section;

wherein the first and second sections snap together with the flexible cable portion arranged therebetween to secure the connector to the flexible cable, the snapping causing the conductive piercing members to pierce the sheath and make electrical contact with the respective conductors.

12. The channel letter as set forth in claim 8, wherein the flexible electrical cable is flexible in a direction perpendicular to an axis defined by the spacing of the positive and negative conductors.

13. The channel letter as set forth in claim 8, wherein intervening cable portions between the spaced apart LED devices are selectively flexed to define a selected channel lettering.

14. The channel letter as set forth in claim 8, wherein the flexible cable includes first and second flexible cables, the flexible lighting device further including:

a splice connector that mechanically and electrically connects first and second flexible cables to make electrical contact with the respective conductors.

15. A channel letter including:

a substantially planar support surface;

a flexible conductor including:

a first flexible conductive element arranged in a first parallel plane that is parallel to the substantially planar support surface, a second flexible conductive element arranged in a second parallel plane that is parallel to the substantially planar support surface, the second parallel plane being spaced from the first parallel plane by a spacing of the conductive elements, and an insulating sheath covering the first and second flexible conductive elements; and a plurality of light emitting diodes spaced along the conductor and secured to both the conductor and the support surface, the light emitting diodes receiving electrical power from the first and second flexible conductive elements.

16. A channel letter including:

an electrical cable including:

at least two flexible electrical conductors, and a flexible, electrically insulating covering surrounding the electrical conductors, the conductors arranged substantially parallel with a selected separation therebetween, the flexible covering including a plurality of dips separated by the selected separation;

a plurality of LEDs, each LED having at least two electrical leads aligned with the dips, the at least two electrical leads electrically contacting the electrical conductors and mechanically piercing the insulating covering at the dips to mechanically secure the LED to the electrical cable; and a channel letter housing inside of which the electrical cable is disposed.

17. The channel letter as set forth in claim 16, wherein each LED includes four electrical leads that electrically contact the electrical conductors and mechanically pierce the insulating covering at the dips to mechanically secure the LED to the electrical cable.

18. The channel letter as set forth in claim 16, wherein the at least two flexible electrical conductors define a flat cable plane, and the electrical cable is disposed in the channel letter housing positioned on-edge respective to a surface of the channel letter on which the electrical cable is disposed.

* * * * *